US006795767B2

(12) United States Patent
Nakamoto et al.

(10) Patent No.: US 6,795,767 B2
(45) Date of Patent: Sep. 21, 2004

(54) ON-VEHICLE ELECTRONIC CONTROLLER

(75) Inventors: Katsuya Nakamoto, Tokyo (JP); Mitsuhiro Kitta, Tokyo (JP); Hiroshi Gokan, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 234 days.

(21) Appl. No.: 09/987,358

(22) Filed: Nov. 14, 2001

(65) Prior Publication Data

US 2002/0169524 A1 Nov. 14, 2002

(30) Foreign Application Priority Data

May 9, 2001 (JP) .................................... 2001-139082

(51) Int. Cl.[7] ........................... G06F 19/00; G06F 13/38
(52) U.S. Cl. ..................................... 701/115; 710/305
(58) Field of Search ........................... 701/115; 710/305

(56) References Cited

U.S. PATENT DOCUMENTS 5,857,158 A * 1/1999 Zimmermann et al. ..... 701/115

FOREIGN PATENT DOCUMENTS

| JP | 5-119811 | 5/1993 | .......... G05B/19/05 |
| JP | 7-13912 | 1/1995 | .......... G06F/13/12 |
| JP | 8-305681 | 11/1996 | .......... G06F/15/78 |
| JP | 9-83301 | 3/1997 | .......... H03H/19/00 |
| JP | 2000-89974 | 3/2000 | .......... G06F/11/00 |
| JP | 2002-089351 A | 3/2002 | |
| JP | 2002-108835 A | 4/2002 | |

* cited by examiner

Primary Examiner—Andrew M. Dolinar
(74) Attorney, Agent, or Firm—Sughrue Mion, PLLC

(57) ABSTRACT

To miniaturize and standardize an on-vehicle electronic controller by improving an input filter circuit in the device. Direct input interface circuits and a direct output interface circuit are connected to a data bus of a microprocessor, which has a nonvolatile memory for storing a control program and so on and a RAM memory for computing. ON/OFF signals inputted from indirect input interface circuits are transmitted to the RAM memory via a variable filter circuit, in which a filter constant is set by a constant setting register, and interactive serial communication circuits. A filter constant stored in the nonvolatile memory is stored in the constant setting register via the interactive serial communication circuits.

13 Claims, 8 Drawing Sheets

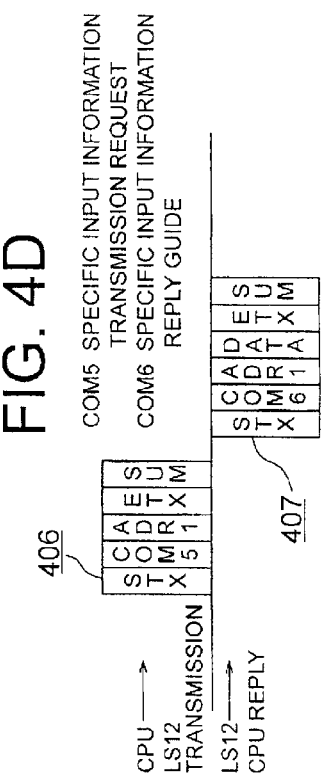
FIG. 4A
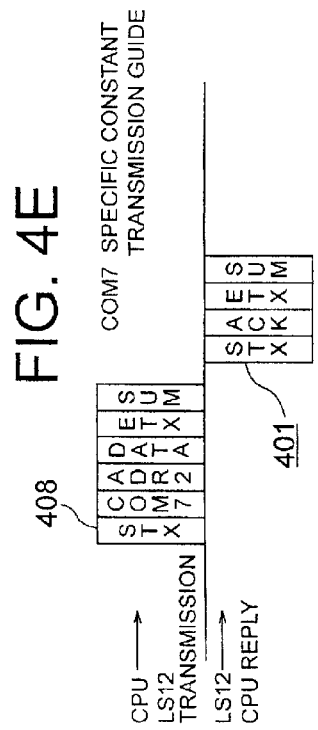
FIG. 4D
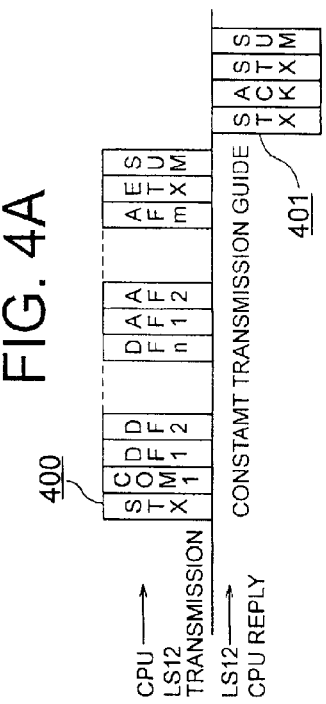
FIG. 4B
FIG. 4C
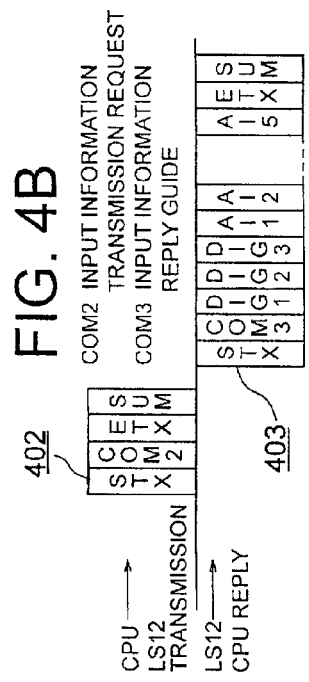
FIG. 4E
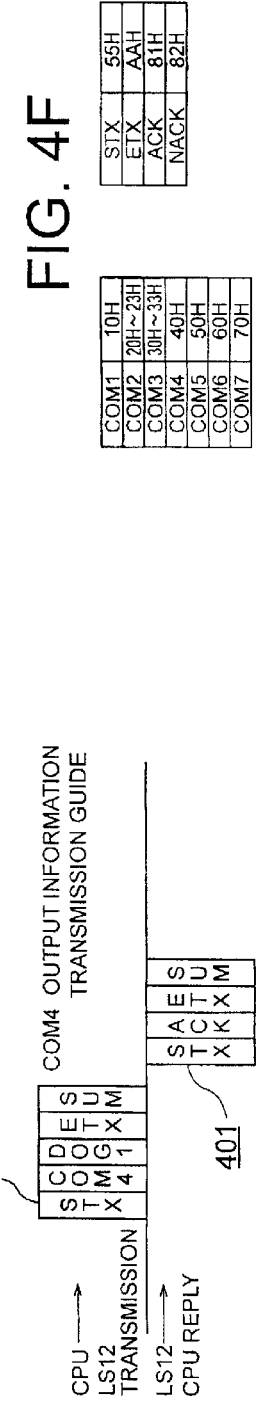
FIG. 4F

ON-VEHICLE ELECTRONIC CONTROLLER

BACKGROUND OF THE INVENTION

1. Field of the Invention

The present invention relates to an on-vehicle electronic controller including a microprocessor used for controlling fuel supply of a vehicle engine, and particularly concerns an on-vehicle electronic controller which is improved in handling a number of input/output signals to miniaturize the controller and is improved to standardize the controller regarding the control on various kinds of vehicles.

2. Description of the Prior Art

FIG. 8 is a typical block circuit diagram showing a conventional one of such electronic controllers, in which an ECU (engine control unit) 1 composed of a single printed board includes a large LSI (integrated circuit component) 2 as a main component. In the LSI 2, a CPU (microprocessor) 3, a nonvolatile flash memory 4, a RAM memory 5, an input data selector 6, an A/D converter 7, an output latch memory 8 and so on are connected via a data bus 30.

The ECU 1 operates in response to control power supplied from a power supply unit 9, which is fed from an on-vehicle battery 10 via a power supply line 11 and a power supply switch 12. An execution program, a control constant for controlling an engine, and soon are stored in the nonvolatile flash memory 4 in advance.

Meanwhile, a number of ON/OFF input signals from sensor switches 13 are supplied from bleeder resistors 14, which serve as pull-up or pull-down resistors, to comparators 19 via series resistors 15 and parallel capacitors 16 that constitute noise filters. Input resistors 17 and reaction resistors 18 are connected to the comparators 19. When a voltage across the parallel capacitor 16 exceeds a reference voltage applied to a negative terminal of the comparator 19, a signal of logic "H" is supplied to the data selector 6.

However, when a voltage across the parallel capacitor 16 decreases, the input from the reaction resistor 18 is added thereto. Thus, the output of the comparator 19 recovers to logic "L" since a voltage across the parallel capacitor 16 decreases to less than a reference voltage of the comparator 19.

As described above, the comparator 19 acts as a level judging comparator having a hysteresis function. A number of outputs from the comparators 19 are stored in the RAM memory 5 via the data selector 6 and the data bus 30.

Additionally, for example, the data selector 6 handles an input of 16 bits and outputs the input to the data bus 30 when receiving a chip select signal from the CPU3. Input points range over several tens points and a plurality of data selectors are used.

Further, a number of analog signals from the analog sensors 20 are supplied to the A/D converters 7 via the series resistors 21 and the parallel capacitors 22 that constitute noise filters. Digital outputs from the A/D converters, which receive chip select signals from the CPU3, are stored in the RAM memory 5 via the data bus 30.

The control output of the CPU3 is stored in the latch memory 8 via the data bus 30 and drives external loads 26 via output transistors 23. A plurality of latch memories is used for a number of control output points, and the control output is stored in the latch memory chip-selected by the CPU3.

Additionally, reference numeral 24 denotes driving base resistors of the transistors 23, reference numeral 25 denotes stable resistors, each connecting base/emitter terminals of the transistor 23, and reference numeral 27 denotes a feeding power supply relay for the external load 26.

A conventional device configured thus is disadvantageous as follows: the LSI 2 is large in size because the CPU 3 handles quite a large number of inputs and outputs, the parallel capacitors 16 and 22 acting as noise filters require capacitors having a variety of capacities in order to obtain a desired filter constant, causing difficulty in standardization, and a large capacitor is needed to obtain a large filter constant, increasing the ECU 1 in size.

As a measure for reducing the input/output terminals of the LSI 2 to miniaturize the LSI 2, for example, Japanese Patent Laid-Open No. 7-13912 specification "INPUT/OUTPUT PROCESSING IC" discloses a method of time-sharing and transferring a number of input/output signals using a serial communication block.

However, this method requires noise filters with a variety of capacities and is not suitable for standardization of the device. Besides, a capacitor demands a large capacity to obtain a sufficient filter constant and is not suitable for miniaturization of the device.

Meanwhile, a concept has been known in which a digital filter is used as a noise filter for ON/OFF input signals and the filter constant is controlled by a microprocessor.

For instance, in "PROGRAMMABLE CONTROLLER" disclosed in Japanese Patent Laid-Open No. 5-119811 specification, when an input logic value of an external input signal subjected to sampling is successively set at the same value for more than one time, the signal is adopted and stored in an input image memory, and a filter constant changing command is provided for changing a sampling period.

In this method, although a filter constant can be changed freely, a microprocessor bears a large burden when handling a number of input signals, resulting in slower response of control. The response is the original object of the microprocessor.

Besides, as an example of a digital filter for ON/OFF signals, Japanese Patent Laid-Open No. 2000-89974 specification discloses "DATA STORAGE/CONTROL CIRCUIT", in which a shift register is provided as hardware and sampling is carried out according to the above-mentioned concept.

Further, for example, Japanese Patent Laid-Open No. 9-83301 specification discloses "SWITCHED CAPACITOR FILTER", in which a digital filter uses a switched capacitor as a noise filter for a multichannel analog input signal.

In this case as well, when handling a number of analog input signals, a microprocessor bears a large burden, resulting in slower response of control. The response of control is the original object of the microprocessor.

Besides, Japanese Patent Laid-Open No. 8-305681 specification discloses "MICROCOMPUTER", in which a resistance of an analog filter composed of a resistor and a capacitor is switched on multiple stages to change a filter constant.

Incidentally, the above conventional device is disadvantageous as in the following.

Namely, as described above, the conventional device is partially but is not fully miniaturized and standardized in an integral manner.

Particularly in case of miniaturizing and standardizing an input/output circuit of a microprocessor, it is not possible to avoid reduction in original control capability and response of the microprocessor.

BRIEF SUMMARY OF THE INVENTION

In order to solve the above-mentioned problem, the first object of the present invention is to provide an on-vehicle electronic controller which reduces a burden of a microprocessor regarding processing input and output to improve its original control capability and response and which entirely miniaturizes and standardizes the controller by reducing an input filter in size.

Moreover, the second object of the present invention is to provide an on-vehicle electronic controller in which a control program and a control constant are changed for kinds of vehicles having different control specifications so as to readily standardize hardware in a more effective manner.

An on-vehicle electronic controller according to claim 1 is constituted by the microprocessor including the nonvolatile memory, in which a control program for a controlled vehicle, a control constant, and so on are written from the external tool, and the RAM memory for computing; the integrated circuit including the direct input interface circuits and the direct output interface circuits that are connected to the data bus of the microprocessor, the variable filter circuit having the indirect input interface circuits and the constant setting registers, and the communication control circuit; and the interactive serial communication circuits for transmitting a plurality of external input signals to the RAM memory, the signals being inputted via the indirect input interface circuits, and for transmitting filter constants stored in the nonvolatile memory to the constant setting registers of the variable filter circuit.

According to the above configuration, it is possible to considerably reduce the number of input/output pins of the microprocessor with a small size at low cost, and it is not necessary to use large capacitors with various capacities for an input filter. Thus, the input interface circuits can be miniaturized and standardized. Further, particularly since a control program for a controlled vehicle and a filter constant are set in the nonvolatile memory in a collective manner, standardization can be achieved with a high degree of freedom. Additionally, the variable filter is controlled in the integrated circuit. Hence, without increasing the burden of the microprocessor, miniaturization and standardization can be achieved by function sharing of the microprocessor and the integrated circuit.

In an on-vehicle electronic controller according to claim 2 of the present invention, some of the indirect input interface circuits are interface circuits for ON/OFF signals, each circuit being constituted by a low-resistance bleeder resistor acting as a load on an input switch, a noise filter composed of a high-resistance series resistor and a small capacitor, and a level-judging comparator having a hysteresis function; the variable filter circuit is constituted by an input deciding register, which is set when a plurality of consecutive level judging results being sampled and stored with a predetermined period are all YES, and which is reset when a plurality of consecutive level judging results are all NO, and a constant setting register for storing a value of at least one of the sampling period and the number of logic judging points for setting/resetting; the output of the input deciding register is transmitted to the RAM memory; and the value of at least one of the sampling period and the number of the logic judging points for setting/resetting is transmitted from the nonvolatile memory to the constant setting register.

According to the above configuration, high-frequency noise is removed by the noise filter and the level-judging comparator that are input interface circuits for ON/OFF signals. Thus, the two-stage variable filter can improve filter characteristics and reduce the burden of the variable filter.

In an on-vehicle electronic controller according to claim 3 of the present invention, some of the indirect input interface circuits are interface circuits for an analog signal, each circuit being composed of a noise filter including positive and negative clip diodes and a small capacitor, the variable filter circuit is constituted by a switched capacitor, which is periodically charged and discharged by a switch, and a constant setting register for storing a value of a charging/discharging period, the output of the switched capacitor is converted to a digital value via an A/D converter, the digital converted value is transmitted to the RAM memory, and a value of the charging/discharging period is transmitted from the nonvolatile memory to the constant setting register.

According to the above configuration, high-amplitude noise and high-frequency noise are removed by the clip diodes and the noise filter that are input interface circuits for an analog signal. Thus, the two-stage variable filter can improve filter characteristics and reduce the burden of the variable filter.

In an on-vehicle electronic controller according to claim 4 of the present invention, part of control output of the microprocessor is supplied to a latch memory which stores a transmitted control output signal via the interactive serial communication circuit, and then to an external load via an indirect output interface circuit connected to the output of the latch memory.

According to the above configuration, direct output terminals of the microprocessor can be reduced so as to further miniaturize the microprocessor at lower cost.

In an on-vehicle electronic controller according to claim 5 of the present invention, direct input and direct output supplied to the data bus of the microprocessor require fast response in an operation such as ignition control of an engine and control of fuel injection, and indirect input and indirect output communicated with the microprocessor via the interactive serial communication circuit are input signals of low-speed and low-frequency operations of a manual operation signal, a temperature sensor, a water temperature sensor and so on, or output signals of low-speed and low-frequency operations of auxiliary output, warning display output and so on.

According to the above configuration, even when response is delayed in serial communication, a serious problem does not occur on the entire control. Thus, it is possible to positively carry out noise protection for an input signal in a number of low-speed and low-frequency operations and to reduce the number of input/output terminals of the microprocessor to achieve miniaturization.

In an on-vehicle electronic controller according to claim 6 of the present invention, the microprocessor transmits a filter constant and a command of input information transmission request that follow a command of filter constant transmission guide to the integrated circuit via the interactive serial communication circuit, and the integrated circuit stores received filter constants in the constant setting registers and transmits indirect input signal information following a command of input information reply guide to the RAM memory via the interactive serial communication circuit and the microprocessor.

According to the above configuration, under the guide and instruction of the microprocessor for exercising entire control, the integrated circuit for processing indirect input can receive filter constants and reply input information in a passive manner. Thus, a hardware structure of the integrated circuit can be simplified with a small size at low cost.

In an on-vehicle electronic controller according to claim 7 of the present invention, the microprocessor transmits a filter constant following the command of filter constant transmission guide and indirect output information or input information transmission request that follows the command of output information transmission guide to the integrated circuit via the interactive serial communication circuit, and the integrated circuit stores received filter constants and indirect output information in the constant setting registers and the latch memory and transmits indirect input signal information following the command of input information reply guide to the RAM memory via the interactive serial communication circuit and the microprocessor.

According to the above configuration, under the guide and instruction of the microprocessor for exercising entire control, the integrated circuit for processing indirect input and output can receive filter constants and indirect output information and reply input information in a passive manner. Thus, even in the case of more kinds of transmitted and received data, the hardware structure of the integrated circuit can be simplified with a small size at low cost.

In an on-vehicle electronic controller according to claim 8 of the present invention, the microprocessor transmits address information following a command of specific input information transmission request to the integrated circuit via the interactive serial communication circuit, and the integrated circuit transmits indirect input information of a designated address following a command of specific input information reply guide to the RAM memory via the interactive communication circuit and the microprocessor.

According to the above configuration, the microprocessor can always obtain specific indirect input information. Thus, even when response is delayed in serial communication, it is possible to monitor the latest state of specific indirect input.

In an on-vehicle electronic controller according to claim 9 of the present invention, the microprocessor transmits address information and filter constants that follow a command of specific constant transmission guide to the integrated circuit via the interactive serial communication circuit, and the integrated circuit stores received filter constants in the constant setting register at a designated address.

According to the above configuration, even during the operation of the microprocessor, some filter constants can be changed and optimization control such as learning correction can be performed on a filter constant. Further, during the operation of the microprocessor, it is difficult to have time for transferring a number of filter constants in a collective manner. However, the above problem can be solved by transmitting only specific filter constants.

BRIEF DESCRIPTION OF THE DRAWINGS

FIG. 4 is a diagram showing a serial communication frame structure of FIG. 1;

DETAILED DESCRIPTION OF THE PREFERRED EMBODIMENTS

Referring to figures, the following will describe embodiments of the present invention.

[Embodiments 1]

Figure 1:
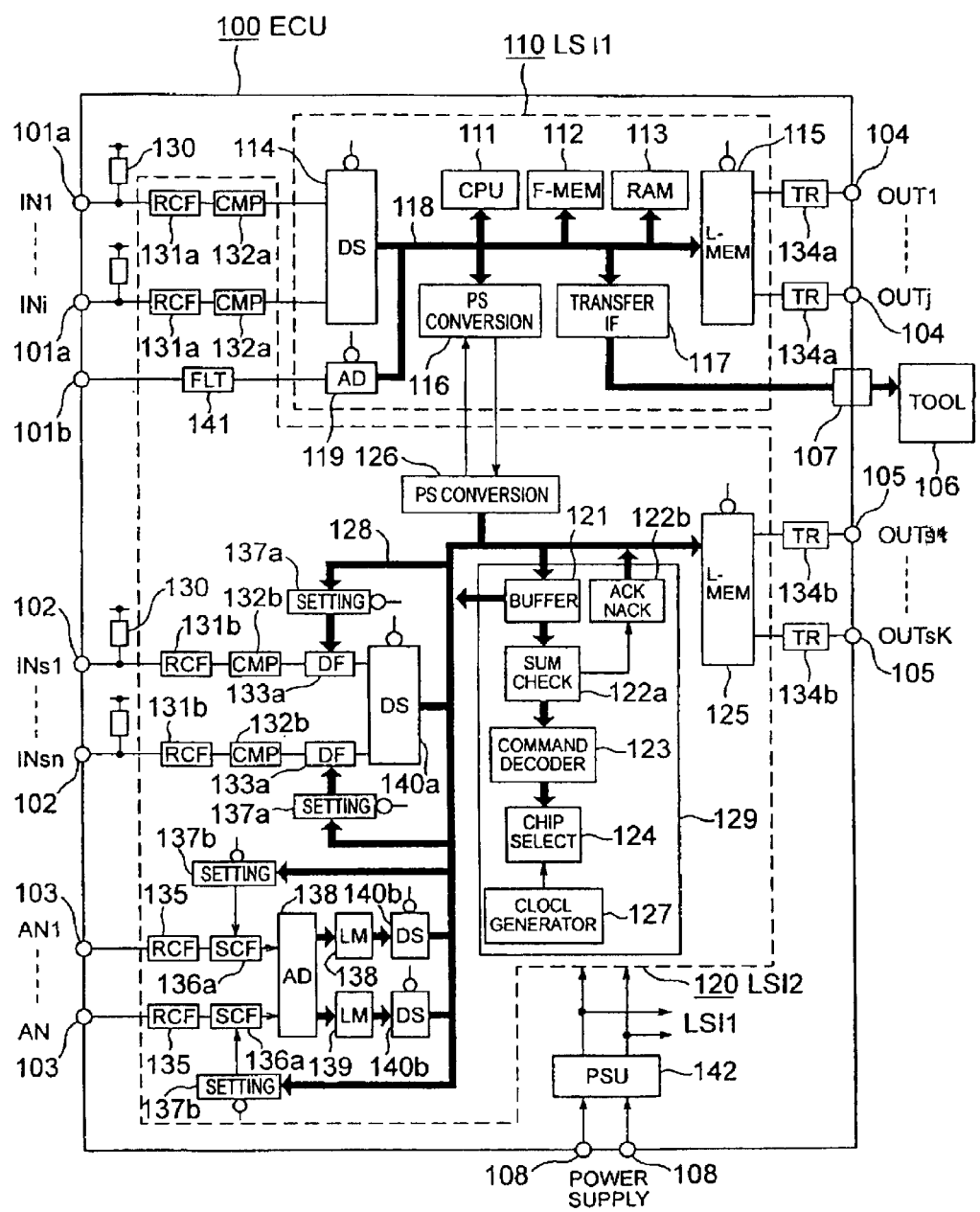
FIG. 1 is a block diagram entirely showing Embodiment 1 of the present invention.

FIG. 1 is a block circuit diagram showing Embodiment 1 of the present invention.

In FIG. 1, reference numeral 100 denotes an ECU (on-vehicle electronic controller), which is composed of a single electronic board including a first LSI (first integrated circuit) 110 and a second LSI (second integrated circuit) 120 as main components.

Reference numeral 101a denotes connector terminals where fast input signals IN1 to INi of ON/OFF operations are inputted. The signals are provided for carrying out relatively frequent operations of a crank angle sensor for controlling timing of igniting an engine and timing of discharging fuel, a speed sensor for controlling auto cruising, and so on, and the signals need to be captured immediately.

Reference numeral 101b denotes a connector terminal where analog signals of a sensor such as an air flow sensor and a knocking sensor are inputted. The signal fluctuates at a relatively high frequency. FIG. 1 shows one representative point.

Reference numeral 102 denotes connector terminals where low-speed input signals INs1 to INsn of ON/OFF operations are inputted. The signals are provided for carrying out relatively less frequent operations of a selector switch for detecting a position of a speed change lever, a switch of an air conditioner, and so on. The operations are not seriously affected by delay in capturing signals.

Reference numeral 103 denotes connector terminals where analog input signals AN1 to ANm are inputted. The signals are provided for carrying out relatively slow operations of a sensor such as an accelerator position sensor, a water temperature sensor, and an oxygen concentration sensor of exhaust gas. The operations are not seriously affected by delay in capturing signals.

Reference numeral 104 denotes connector terminals where fast outputs OUT1 to OUTj of ON/OFF operations are outputted. The signals are provided for carrying out relatively frequent operations of ignition coil driving output of an engine, solenoid valve driving output for controlling injection of fuel, and so on. Driving output needs to be produced without delay.

Reference numeral 105 denotes connector terminals where low-speed outputs OUTs1 to OUTsk of ON/OFF operations are outputted. The signals are provided for carrying out relatively less frequent operations of electromagnetic clutch driving output for an air conditioner, display warning output, and so on. The operations are not seriously affected by delay in response of driving output.

Reference numeral 106 denotes an external tool for transferring and writing a control program, a control constant, and so on in advance to the ECU 100. The external tool is used during shipment of a product or maintenance work and is connected to the ECU 100 via a detachable connector 107.

Reference numeral 108 denotes power supply terminals connected to an on-vehicle battery. The power supply terminal is composed of sleep terminals, which are fed directly from the on-vehicle battery to maintain the operations of the terminals fed from a power supply switch (not shown) and a memory (described later).

The first LSI 110 is composed of a microprocessor 111, a nonvolatile memory 112, a RAM memory 113, an input data selector 114, an output latch memory 115, a serial-parallel converter 116 for communicating a serial signal with the second LSI 120 (described later), an SCI (Serial Communication Interface) 117 for communicating a serial signal with the external tool 106, an AD converter 119, and so on. The members are connected to the microprocessor 111 via a data bus 118 of 8 to 32 bits.

Additionally, for example, the nonvolatile memory 112 is a flash memory being capable of batch writing. A transfer control program, a vehicle control program, a vehicle control constant, and so on are transferred and written from the external tool 106 via the RAM memory 113.

Besides, the configuration of the second LSI (integrated circuit) 120 will be discussed.

ON/OFF signals inputted from the fast input terminals 101a are captured to the second LSI 120 via bleeder resistors 130 and are directly applied to the input data selector 114 via noise filters 131a and level-judging comparator 132a that act as direct input interface circuits.

For example, eight or less fast ON/OFF input signals are applied to the input data selector 114. When the microprocessor 111 selects a chip, ON/OFF information is transmitted to the data bus 118.

Reference numeral 141 denotes a band-pass filter connecting the fast input terminal 101b and the AD converter 119. For example, the band-pass filter 141 constitutes a direct input interface circuit for an analog signal of a piezoelectric sensor, which detects knocking and the like of an engine.

Additionally, the bleeder resistors 130 each have a low resistance of several KΩ and are connected to the ON/OFF input terminals IN1 to INi and INs1 to INsn and a positive side (pull-up) or a negative side (pull-down) of a power supply such that the bleeder resistors 130 act as loads on input signal switches. The bleeder resistors 130 prevent the superposition of noise that is resulted from an input terminal entering an open state when an input switch is turned off, and the bleeder resistors 130 improve reliability of contact when the input switch is a contact point.

Besides, the noise filters 131a are equivalents of noise filters 131b, which will be described in FIG. 2. The level-judging comparators 132a are equivalents of level-judging comparators 132b, which will be described in FIG. 2.

ON/OFF signals inputted from the low-speed terminals 102 are captured into the second LSI 120 via the bleeder resistors 130 and are applied to an input data selector 140a via the noise filters 131b, the level-judging comparators 132b, and variable filter circuits 133a that act as indirect input interface circuits. The detail of the variable filter circuits 133a will be discussed in FIG. 2.

Besides, the variable filter circuit 133a includes a constant setting register 137a for storing a filter constant.

Eight or less indirect ON/OFF input signals are applied to the input data selector 140a. When an address select circuit 124 (described later) selects a chip, ON/OFF information is transmitted to a data bus 128. In case of handling more than eight signals, the second and third input data selectors are used and are successively chip-selected to transmit ON/OFF information to the data bus 128.

Analog signals inputted from the low-speed input terminals 103 are inputted to latch memories 139, which store a digital value of each channel, via noise filters 135 acting as indirect input interface circuits, variable filter circuits 136a, and a multichannel AD converter 138. The detail of the variable filter circuit 136a will be discussed in FIG. 3.

Besides, the variable filter circuit 136a includes a constant setting register 137b for storing a filter constant. The latch memories 139 are connected to a data bus 128 via the input data selectors 140b.

Reference numeral 126 denotes a serial-parallel converter paired with the serial-parallel converter 116 that constitutes the serial interface circuit. Reference numeral 121 denotes a buffer memory for temporarily storing a series of information transmitted from the microprocessor 111 via the serial-parallel converters 116 and 126. Reference numeral 122a denotes a data check circuit for checking data in the buffer memory 121. Reference numeral 122b denotes a data register for acknowledgement response. Reference numeral 123 denotes a command decoder which operates when the data check circuit 122a performs normal data check. Reference numeral 124 denotes an address select circuit for selecting an address of data to be transmitted and received according to the content of the command decoder 123. Reference numeral 127 denotes a clock generator. The buffer memory 121 to the clock generator 127 constitute a communication control circuit 129.

Reference numeral 128 denotes a data bus connecting the parallel terminal of the serial-parallel converter 126, the buffer memory 121, the data register 122b for acknowledgement response, the constant setting registers 137a and 137b, the input data selectors 140a and 140b, the latch memory 125 for indirect output, and so on. The method of transferring data by the communication control circuit 129 will be described in FIG. 4.

Reference numerals 134a and 134b denote load driving transistors which constitute a direct output interface circuit or an indirect output interface circuit. The transistors each make connection between the latch memory 115 and the fast output terminals 104 and between the latch memory 125 and the low-speed output terminals 105. External loads OUT1 to OUTJ and OUTs1 to OUTsk are driven by output signals of the latch memories 115 and 125.

Reference numeral 142 denotes a power supply unit which is fed from the power supply terminal 108 and feeds the first LSI 110 and the second LSI 120. The power supply unit 142, the bleeder resistor 130, the output transistors 134a and 134b, and so on are provided outside the second LSI 120.

Additionally, as a fast input signal (not shown), signals such as an operation confirmation signal and a load current detection signal of the output transistor 134a are captured into the microprocessor 111 as signals produced in the ECU 100.

Figure 2:
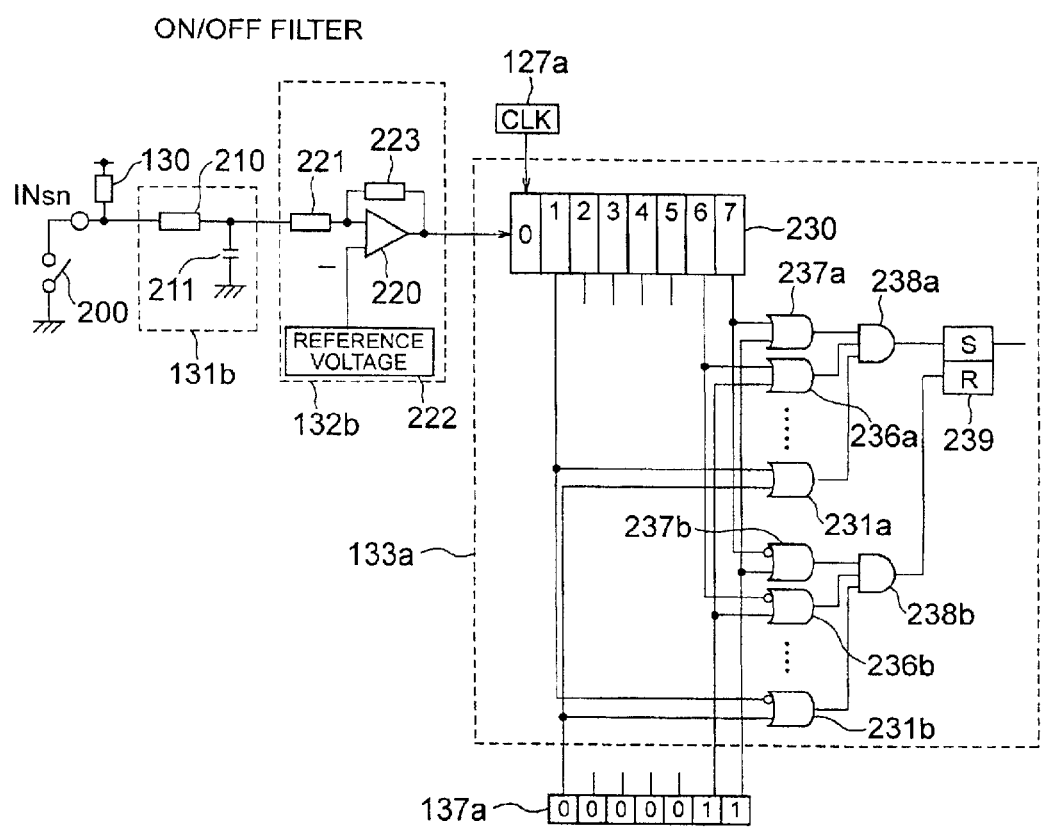
FIG. 2 is a block diagram showing an ON/OFF signal variable filter of FIG. 1.

FIG. 2 shows the detail of the variable filter circuit 133a and its periphery circuits of FIG. 1.

In FIG. 2, an input signal INsn, which has the low-resistance bleeder resistor 130 for an input switch 200, is connected to a parallel small capacitor 211 of ten pF or so via a series resistor 210 having a high resistance of several hundreds KΩ, which is an upper limit of practical use.

Reference numeral 131b denotes the noise filter composed of the series resistor 210 and the small capacitor 211 and is provided for absorbing and smoothing high-frequency noise.

Reference numeral 132b denotes the level-judging comparator composed of an input resistor 221, a reaction resistor 223, and a comparator 220. A prescribed reference voltage 222 (voltage Von) is applied to the inverted input of the comparator 220.

Therefore, when a charging voltage of the small capacitor 211 is a reference voltage Von or more, the output of the comparator 220 is "H" (logic "1"). The hysteresis function is provided such that when the output of the comparator 220 is "H", since the reaction resistor 223 adds an input, the output of the comparator 220 is not set at "L" (logic "0") unless a charging voltage of the small capacitor 211 decreases to Voff (<Von).

The function is provided for preventing noise ripple, which is superposed in the small capacitor 211, from frequently inverting the output of the comparator 220.

The output of the comparator 220 is inputted to a shift register 230 constituting the variable filter circuit 133a, and shifting pulse input with a frequency T is supplied to the shift register 230 from a clock generator 127a.

Thus, the logic contents of stages following the shift register 230 are equivalent to the output logic contents of the comparator 220 at some points in the past.

Reference numerals 231a to 237a denote first logic gate elements for ORing logic contents of the output stages of the shift register 230 and logic contents of the bits of the constant setting register 137a. Reference numeral 238a denotes an AND element for connecting the outputs of the logic gate elements 231a to 237a. Reference numeral 239 denotes an input deciding register composed of flip-flop elements set by the output of the AND element 238a.

Moreover, reference numerals 231b to 237b denote second logic gate elements for ORing inverted logic contents of the output stages of the shift register 230 and logic contents of the bits of the constant setting register 137a. Reference numeral 238b denotes an AND element for connecting the outputs of the logic gate elements 231b to 237b. The input deciding register 239 is reset by the output of the AND element 238b.

In the variable filter circuit 133a configured thus, when the contents of the output stages of the shift register 230 are all logic "1", the output of the AND element 238a sets the output of the input deciding register 239 at logic 1.

However, when some contents of the constant setting register 137a are logic "1", the corresponding logic contents of the output stages of the shift register 230 may be set at "0".

Therefore, in FIG. 2, when the first to fifth stages of the shift register 230 all have logic contents of "1", the output of the input deciding register 239 is set at logic "1".

Also, when the contents of the output stages of the shift register 230 are all set at logic "0", the output of the AND element 238b resets the output of the input deciding register 239 at logic "0".

However, when some contents of the constant setting register 137a are logic "1", the corresponding logic contents of the output stages of the shift register 230 may be set at "1".

Therefore, in FIG. 2, when the first to fifth stages of the shift register 230 all have logic contents of "0", the output of the input deciding register 239 is set at logic "0".

As described above, the number of logic determination points for judging the output content of the input deciding register 239 is set variably according to the contents of the constant setting register 137a.

Additionally, instead of variably changing the number of logic determination points as described above, a pulse frequency of the clock generator 127a may be set variably.

Figure 3:
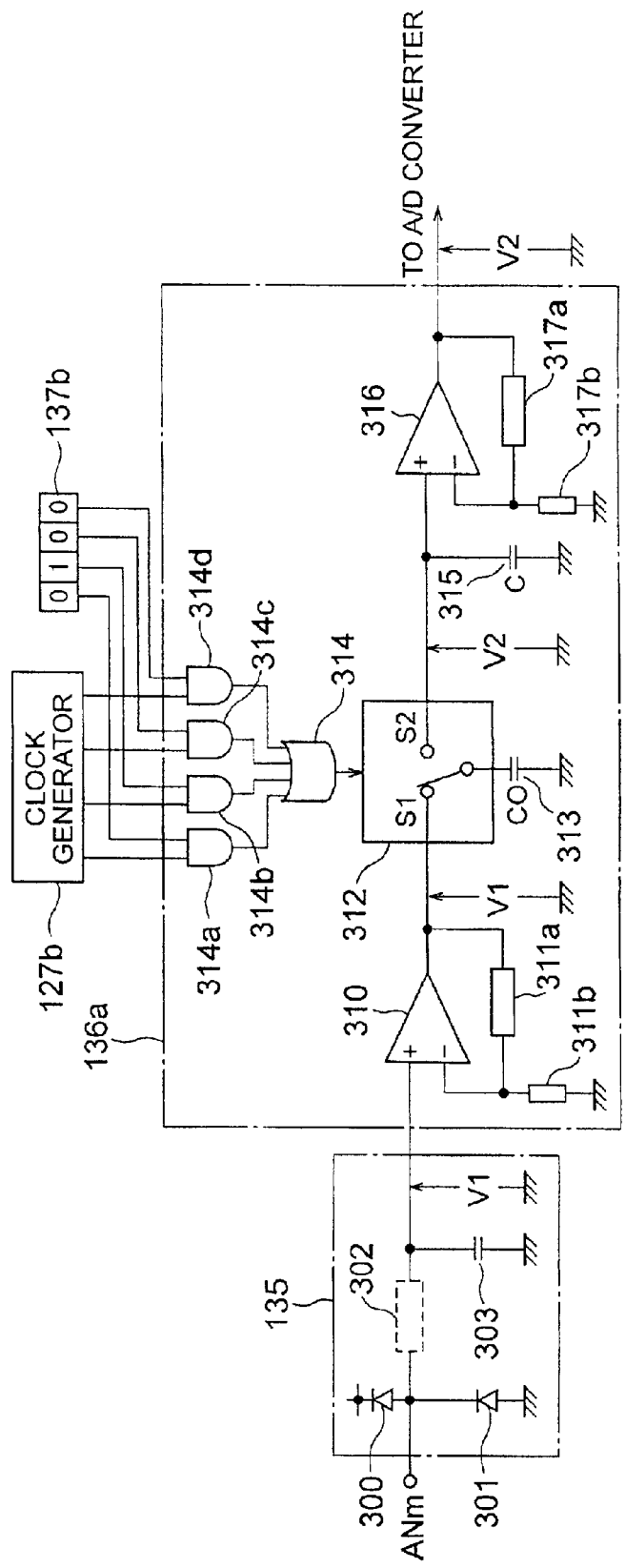
FIG. 3 is a block circuit diagram showing an analog signal variable filter of FIG. 1.

FIG. 3 shows an explanatory equivalent circuit of the variable filter circuit 136a and its periphery circuits of FIG. 1.

In FIG. 3, reference numeral 135 denotes a noise filter for an analog input signal ANm. The noise filter 135 is composed of a positive clip diode 300, a negative clip diode 301, a series resistor 302, and a parallel small capacitor 303.

When excessive noise is superposed to the analog input signal ANm, the clip diodes 300 and 301 reflux the noise voltage to the positive and negative circuits of the power supply to prevent a voltage more than a maximum value or less than a minimum value of an assumed analog signal from being applied to the small capacitor 303.

Further, when an analog sensor (not shown) connected to the ANm terminal has an equivalent internal resistance, the series resistor 302 can be omitted.

A capacitor 313 (capacity C0) constituting the variable filter circuit 136a is periodically switched to a signal side S1 or an output side S2 by a switch 312. A switching period T is a value obtained by selecting and setting frequency division outputs of a clock generator 127b by a constant setting register 137b.

Additionally, reference numerals 314a to 314d denote AND elements for selected gate. Reference numeral 314 denotes an OR element for connecting the outputs of the AND elements 314a to 314d. The output of the OR element 314 is the switching period T for the switch 312.

A voltage V1 across the small capacitor 303 is applied to the signal side S1 via an amplifier 310. An output capacitor 315 (capacity C) is connected to the output side S2. A voltage V2 across the capacitor 315 is converted to a digital value via an amplifier 316 and the AD converter 138 of FIG. 1 and is stored in the latch memory 139.

Besides, reference numerals 311a, 331b, 317a, and 317b are feedback circuit resistors for making connection between the outputs of the amplifiers 310 and 316 and the inverted inputs of the amplifiers.

In the variable filter circuit 136a configured thus, when a charging/discharging resistance is sufficiently small relative to a capacity C0 of the capacitor 313, the following equation is established.

Accumulated charge of the capacitor 313 on the S1 side $Q1=C0\times V1$

Accumulated charge of the capacitor 313 on the S2 side $Q2=C0\times V2$

Moving charge in T seconds $Q=Q1-Q2=C0\times(V1-V2)$

Average current in T seconds $I=Q/T=C0\times(V1-V2)/\text{i T}$

Equivalent resistance $R0=(V1-V2)/I=T/C0$

Therefore, the variable filter circuit 136a with the above configuration is equivalent to an RC filter composed of a series resistor RA (=R0) and an output capacitor CA, and the series resistor RA increases with the switching period T. The switching period T can be changed variably according to the content of the constant setting register 137b.

Next, operations will be discussed.

First, the following will discuss FIGS. 4a to 4f showing data transmitting frame structures of serial communication.

FIG. 4a shows a data transmitting frame structure in which a filter constant stored in the nonvolatile memory 112 is transmitted to the constant setting registers 137a and 137b in the second LSI 120 via the microprocessor 111, the serial-parallel converters 116 and 126. The upper stage shows transmitted data of the microprocessor 111, and the lower stage shows replied data of the second LSI 120.

In FIG. 4a, reference numeral 400 shows a constant transmitting frame structure, which is composed of a transmission start frame STX, a command frame COM1, filter constant frames DF1 to DFn corresponding to indirect ON/OFF input signals INs1 to INsn, filter constant frames AF1 to AFm corresponding to indirect analog input signals AN1 to ANm, a transmission end frame ETX, and a sum data frame SUM.

As shown in FIG. 4f, for example, the transmission start frame STX is 11-bit data in total that is composed of 8-bit data having fifty five values in hexadecimal, a start bit, a parity bit, and a stop bit.

Likewise, as shown in FIG. 4f, the command frame COM1 is 11-bit data in total that is composed of 8-bit data having ten values in hexadecimal, a start bit, a parity bit, and a stop bit.

Also, each of the filter constant frames DF1 to DFn and AF1 to Afm is 11-bit data in total that is composed of 8-bit filter constant data, a start bit, a parity bit, and a stop bit.

As shown in FIG. 4f, for example, the transmission end frame ETX is 11-bit data in total that is composed of 8-bit data having AA values in hexadecimal, a start bit, a parity bit, and a stop bit.

Besides, the sum data frame SUM is 11-bit data in total that is composed of 8-bit data, a start bit, a parity bit, and a stop bit. The 8-bit data is a vertical bit added value (binary added value without carrying) of the bits of the series of frames.

Reference numeral 401 denotes a frame structure for reception acknowledgement that is composed of a transmission start frame STX, a reception acknowledgement frame ACK, a transmission end frame ETX, and a sum data frame SUM. As shown in FIG. 4f, for example, the reception acknowledgement frame ACK is 11-bit data in total that is composed of 8-bit data having eighty one values in hexadecimal, a start bit, a parity bit, and a stop bit.

Since the transmission end frame ETX, the sum data frame SUM, and the transmission start frame STX are identical to those described above, the explanations thereof are omitted.

Bit information of the frames is subjected to parallel-series conversion in the serial-parallel converter 116 and is transmitted to the serial-parallel converter 126. The serial-parallel converter 126 carries out serial-parallel conversion for each frame and supplies a reception completion signal of a single frame to the buffer memory 121. Data of a single frame that is received at this timing is stored in the buffer memory 121.

The buffer memory 121 is a data table having a FIFO structure, and all the frame data are successively stored therein.

Meanwhile, the data check circuit 122a carries out vertical bit addition (binary addition without carrying) of the bits every time data of a single frame is received. When additions of the frames STX to SUM transmitted by the microprocessor 111 are all 0, the received data is judged as being normal. If 1 is included, the data is judged as being abnormal.

When the received data is normal, the frame data of STX, ACK, ETX, and SUM that is written in the data register 122b for acknowledgement response is transmitted to the microprocessor 111 via the serial-parallel converters 126 and 116. This is shown in the reception acknowledgement frame structure 401 of FIG. 4a.

However, if the reception data is abnormal, for example, the content of the acknowledgement response frame ACK is changed to hexadecimal 82 (NACK) shown in FIG. 4f. The microprocessor 111 receiving the content performs an operation such as transmitting a filter constant again.

When the received data is normal, the command decoder 123 judges the content of the command frame COM1 and writes logic "1" at a predetermined position the address selection circuit 124, which is composed of bit shift registers. The front register of a number of the constant setting registers 137a and 137b is designated by the predetermined position.

The clock generator 127 successively supplies shift signals to the shift registers constituting the address select circuit 124. Thus, a number of the constant setting registers 137a and 137b are selected one by one and are connected to the data bus 128.

In synchronization with the selecting operation, the filter constants stored in the buffer memory 121 are successively read and are connected to the data bus 128, and the filter constant is written to one of the selected constant setting registers 137a and 137b.

FIG. 4b shows a data transmitting frame structure, in which indirect input signal information in the second LSI 120 is transmitted to the RAM memory 113 via the serial-parallel converters 126 and 116 and the microprocessor 111. The upper stage shows transmitted data of the microprocessor 111, and the lower stage shows the replied data of the second LSI 120.

In FIG. 4b, reference numeral 402 denotes a frame structure for requesting transmission of input information that is composed of a transmission start frame STX, a command frame COM2, a transmission end frame ETX, and a sum data frame SUM. Each of the frames is 11-bit data including a start bit, a parity bit, and a stop bit. The input information transmission request command COM2 has, for example, four kinds of 20, 21, 22, and 23 in hexadecimal as shown in FIG. 4f.

The command is provided for dividing large input information into four groups and transmitting it. When the input information is transmitted at once, only a single kind of command is necessary.

Reference numeral 403 denotes an input information reply frame structure that is composed of a transmission start frame STX, a command frame COM3, digital input frames DIG1, DIG2, and DIG3, each being composed of 8 indirect ON/OFF input signals INs1 to INsn, digital conversion frames AI1 to AI5 corresponding to some of indirect analog input signals AN1 to ANm, a transmission end frame ETX, and a sum data frame SUM. As shown in FIG. 4f, for example, the command frame COM3 is 11-bit data in total that is composed of 8-bit data having values of 30, 31, 32, and 33 in hexadecimal, a start bit, a parity bit, and a stop bit. The content of the command frame COM3 corresponds to that of the command frame COM2.

Besides, the number of the digital input frames DIG1, DIG2, and DIG3 is changed according to the number of the indirect ON/OFF input signals INs1 to INsn. 24 points/3 frames are sufficient in practical use.

Moreover, the indirect analog input signals AN1 to ANm are 29 points/29 frames or less in practical use, and the total is 32 frames or less. Hence, reply can be made every 8 frames by dividing the frames into four groups.

Therefore, when the command frame COM2 is 20, 21, 22, and 23, the command frame COM3 is 30, 31, 32, and 33. The succeeding reply input information ranges from addresses DIG1 to AI5, AI6 to AI13, AI14 to AI21, and AI22 to AI29.

Bit information of the frames shown in the frame structure 402 for requesting transmission of input information is subjected to parallel-series conversion in the serial-parallel converter 116 and is transmitted to the serial-parallel converter 126. The serial-parallel converter 126 carries out serial-parallel conversion for each frame, a reception completion signal of a single frame is supplied to the buffer memory 121, and data received at this timing is stored in the buffer memory 121.

The buffer memory 121 is a data table having a FIFO structure, and all the frame data are successively stored therein.

Meanwhile, the data check circuit 122a carries out vertical bit addition (binary addition without carrying) of the bits every time data of a single frame is received. When the additions of the frames STX to SUM transmitted by the microprocessor 111 are all 0, the received data is judged as being normal. If 1 is included, the data is judged as being abnormal.

When the received data is normal, the command decoder 123 judges the content of the command frame COM2 and writes logic "1" at a predetermined position the address selection circuit 124, which is composed of bit shift registers. The front data selector of a number of the input data selectors 140a and 140b is designated by the predetermined position.

The clock generator 127 successively supplies shift signals to the shift registers constituting the address select circuit 124. Thus, a number of the input data selectors 140a and 140b are selected one by one and are connected to the data bus 128.

In synchronization with the selecting operation, the bit information of the frames is subjected to parallel-series conversion in the serial-parallel converter 126 and is transmitted to the serial-parallel converter 116. The serial-parallel converter 116 carries out serial-parallel conversion for each frame, and a reception completion signal of a single frame is supplied to the microprocessor 111. Data of the single frame that is received at this timing is stored in the RAM memory 113.

Additionally, a transmitting buffer memory (not shown) is provided in an actual configuration, and the input information to be transmitted to the microprocessor 111 is stored in the buffer memory. Further, a transmission start frame STX, an input information reply guide command COM3, a transmission end frame ETX, and sum data frame SUM are added at the front and rear of the input information. A start bit, a parity bit, and a stop bit are added to the input information. The contents of the transmission buffer memory are successively transmitted to the microprocessor 111 via the serial-parallel converters 126 and 116 in response to the operation of the address select circuit 124.

Besides, when abnormality is found in a sum checking operation of the input information transmission request frame 402 from the microprocessor 111, an acknowledgement response NACK is replied instead of reply of input information. The microprocessor 111 receiving the NACK performs an operation such as transmitting the input information transmission request frame 402 again.

FIG. 4c shows a data transmission frame structure in which indirect output information stored in the RAM memory 113 is transmitted to the output latch memory 125 in the second LSI 120 via the microprocessor 111, the serial-parallel converters 116 and 126. The upper stage shows transmitted data of the microprocessor 111, and the lower stage shows replied data of the second LSI 120.

In FIG. 4c, reference numeral 404 denotes a frame structure of an output information transmission guide that is composed of a transmission start frame STX, a command frame COM4 for output information transmission guide, a digital output frame DOG1 composed of eight indirect outputs OUTs1 to OUTsk, a transmission end frame ETX, and a sum data frame SUM. Each of the frames is 11-bit data including a start bit, a parity bit, and a stop bit. The command COM4 for output information transmission guide, for example, has forty values in hexadecimal as shown in FIG. 4f.

Additionally, the number of digital output frames DOG1 succeeding the command COM4 is changed according to the number of the indirect outputs OUTs1 to OUTsk.

Reference numeral 401 denotes a frame structure for reception acknowledgement that is composed of a transmitting start frame STX, a reception acknowledgement frame ACK, a transmission end frame ETX, and a sum data frame SUM.

Bit information of the frames in the output information transmission guide frame structure 404 is subjected to parallel-series conversion in the serial-parallel converter 116 and is transmitted to the serial-parallel converter 126. The serial-parallel converter 126 carries out serial-parallel conversion for each frame and supplies a reception completion signal of a single frame to the buffer memory 121. Data of the single frame that is received at this timing is stored in the buffer memory 121.

The buffer memory 121 is a data table having a FIFO structure, and all the frame data are successively stored therein.

Meanwhile, the data check circuit 122a carries out vertical bit addition (binary addition without carrying) of the bits every time data of a single frame is received. When additions of the frames STX to SUM transmitted by the microprocessor 111 are all 0, the received data is judged as being normal. If 1 is included, the data is judged as being abnormal.

When the received data is normal, the frame data of STX, ACK, ETX, and SUM that is written in the data register 122b for acknowledgement response is transmitted to the microprocessor 111 via the serial-parallel converters 126 and 116. This is shown by the reception acknowledge frame structure 401 of FIG. 4c.

However, if the received data is abnormal, for example, the content of the acknowledgement response frame ACK is changed to hexadecimal 82 (NACK) shown in FIG. 4f. The microprocessor 111 receiving the NACK performs an operation such as transmitting a filter constant again.

When the received data is normal, the command decoder 123 judges the content of the command frame COM4 and writes logic "1" at a predetermined position the address select circuit 124, which is composed of bit shift registers. The front latch memory of a number of the output latch memories 125 is designated by the predetermined position (here, a single output latch memory is provided in FIG. 4c).

The clock generator 127 successively supplies shift signals to the shift registers constituting the address select circuit 124. Thus, a number of the output latch memories 125 are selected one by one and are connected to the data bus 128.

In synchronization with the selecting operation, the indirect output information stored in the buffer memory 121 is successively read and is connected to the data bus 128, and the indirect output information is written to one of the selected output latch memories 125.

FIG. 4d shows a data transmitting frame structure, in which the content of specific indirect input signal information in the second LSI 120 is transmitted to the RAM memory 113 via the serial-parallel converters 126 and 116 and the microprocessor 111. The upper stage shows transmitted data of the microprocessor 111, and the lower stage shows the replied data of the second LSI 120.

In FIG. 4d, reference numeral 406 denotes a frame structure for specific input information transmission request that is composed of a transmission start frame STX, a command frame COM5, an address frame ADR1, a transmission end frame ETX, and a sum data frame SUM. Each of the frames is 11-bit data including a start bit, a parity bit, and a stop bit. The specific input information transmission request command COM5, for example, has fifty values in hexadecimal as shown in FIG. 4f.

Reference numeral 407 denotes a specific input information reply frame structure that is composed of a transmission start frame STX, a command frame COM6, an address frame ADR1, an indirect input information frame DATA of the designated address, a transmission end frame ETX, and a sum data frame SUM. As shown in FIG. 4f, for example, the command frames COM5 and COM6 are each 11-bit data in total that is composed of 8-bit data having values of 50 and 60 in hexadecimal, a start bit, a parity bit, and a stop bit.

Besides, the content of the address frame ADR1 is indicated by serial numbers such as 0 to 31 that refer to the digital input frames DIG1 to DIG3 and digital converting frames AI1 to AIm.

Regarding the frames shown in the frame structure 406 for transmission request of specific input information, bit information is subjected to parallel-series conversion in the serial-parallel converter 116 and is transmitted to the serial-parallel converter 126. The serial-parallel converter 126 carries out serial-parallel conversion for each frame and supplies a reception completion signal of a single frame to the buffer memory 121. Data of the single frame that is received at this timing is stored in the buffer memory 121.

The buffer memory 121 is a data table having a FIFO structure, and all the frame data are successively stored therein.

Meanwhile, the data check circuit 122a carries out vertical bit addition (binary addition without carrying) of the bits every time data of a single frame is received. When additions of the frames STX to SUM transmitted by the microprocessor 111 are all 0, the received data is judged as being normal. If 1 is included, the data is judged as being abnormal.

When the received data is normal, the command decoder 123 judges the content of the command frame COM5 and writes logic "1" at a predetermined position the address select circuit 124, which is composed of bit shift registers. Of a number of the input data selectors 140a and 140b, the data selector having a number designated in the address frames ADR1 is designated by the predetermined position.

In synchronization with the above designating operation, bit information of the frames is subjected to parallel-series conversion in the serial-parallel converter 126 and is transmitted to the serial-parallel converter 116. The serial-parallel converter 116 carries out serial-parallel conversion for each frame and supplies a reception completion signal of a single frame to the microprocessor 111. Data of the single frame that is received at this timing is stored in the RAM memory 113.

However, a transmission start frame STX, a specific input information reply guide command COM6, a transmission end frame ETX, a sum data frame SUM and so on are added at the front and rear of the reply of the input information. A start bit, a parity bit, and a stop bit are added to the input information.

Besides, when abnormality is found in a sum checking operation of the frame 406 for transmission request of specific input information from the microprocessor 111, an acknowledgement response NACK is replied instead of reply of specific input information. The microprocessor 111 receiving the NACK performs an operation such as transmitting again the frame 406 for transmission request of specific input information.

Additionally, the command COM5 for transmission request of specific input information is arranged to increase the frequency of communication with the microprocessor 111, regarding indirect inputs, which change input information with a relatively high frequency, of a number of indirect inputs.

FIG. 4e shows a data transmitting frame structure in which a specific filter constant stored in the nonvolatile memory 112 is transmitted to a specific constant setting register of the constant setting registers 137a and 137b in the second LSI 120 via the microprocessor 111, the serial-parallel converters 116 and 126. The upper stage shows transmitted data of the microprocessor 111, and the lower stage shows replied data of the second LSI 120.

In FIG. 4e, reference numeral 408 shows a frame structure of specific constant transmission guide that is composed of a transmission start frame STX, a command frame COM7 of specific constant transmission guide, an address frame ADR2, a filter constant frame DATA for a designated address, a transmission end frame ETX, and a sum data frame SUM. Each of the frames is 11-bit data that includes a start bit, a parity bit, and a stop bit. The command COM7 of specific constant transmission guide, for example, has seventy values in hexadecimal as shown in FIG. 4f.

Reference numeral 401 denotes a frame structure for reception acknowledgement that is composed of a transmission start frame STX, a reception acknowledgement frame ACK, a transmission end frame ETX, and a sum data frame SUM.

Regarding the frame structure 408 of specific constant transmission guide, bit information of the frames is subjected to parallel-series conversion in the serial-parallel converter 116 and is transmitted to the serial-parallel converter 126. The serial-parallel converter 126 carries out serial-parallel conversion for each frame and supplies a reception completion signal of a single frame to the buffer memory 121. Data of the single frame that is received at this timing is stored in the buffer memory 121.

The buffer memory 121 is a data table having a FIFO structure, and all the frame data are successively stored therein.

Meanwhile, the data check circuit 122a carries out vertical bit addition (binary addition without carrying) of the bits every time data of a single frame is received. When additions of the frames STX to SUM transmitted by the microprocessor 111 are all 0, the received data is judged as being normal. If 1 is included, the data is judged as being abnormal.

When the received data is normal, the frame data of STX, ACK, ETX, and SUM that is written in the data register 122b for acknowledgement response is transmitted to the microprocessor 111 via the serial-parallel converters 126 and 116. This is shown by the reception acknowledgement frame structure 401 of FIG. 4a.

However, if the received data is abnormal, for example, the content of the acknowledgement response frame ACK is changed to hexadecimal 82 (NACK) shown in FIG. 4f. The microprocessor 111 receiving the NACK performs an operation such as transmitting a filter constant again.

When the received data is normal, the command decoder 123 judges the content of the command frame COM7 and writes logic "1" at a predetermined position the address select circuit 124, which is composed of bit shift registers. A specific register of a number of the constant setting registers 137a and 137b is designated by the predetermined position.

In synchronization with the designating operation, the filter constant stored in the buffer memory 121 is read and connected to the data bus 128, and the filter constant is written to one of the selected constant setting registers 137a and 137b.

Additionally, when transferring a filter constant shown in FIGS. 4a and 4e, a filter constant stored in the nonvolatile memory 112 is actually transmitted to the constant setting registers 137a and 137b in the second LSI 120 via the RAM memory 113. Part of the content of the RAM memory 113, which stores a filter constant in the above manner, is subjected to learning correction during the operation of the microprocessor 111. A filter constant of a specific address, which is subjected to learning correction, is transmitted to a specific constant setting register by the command COM7 of specific constant transmission guide of FIG. 4e.

Figure 5:
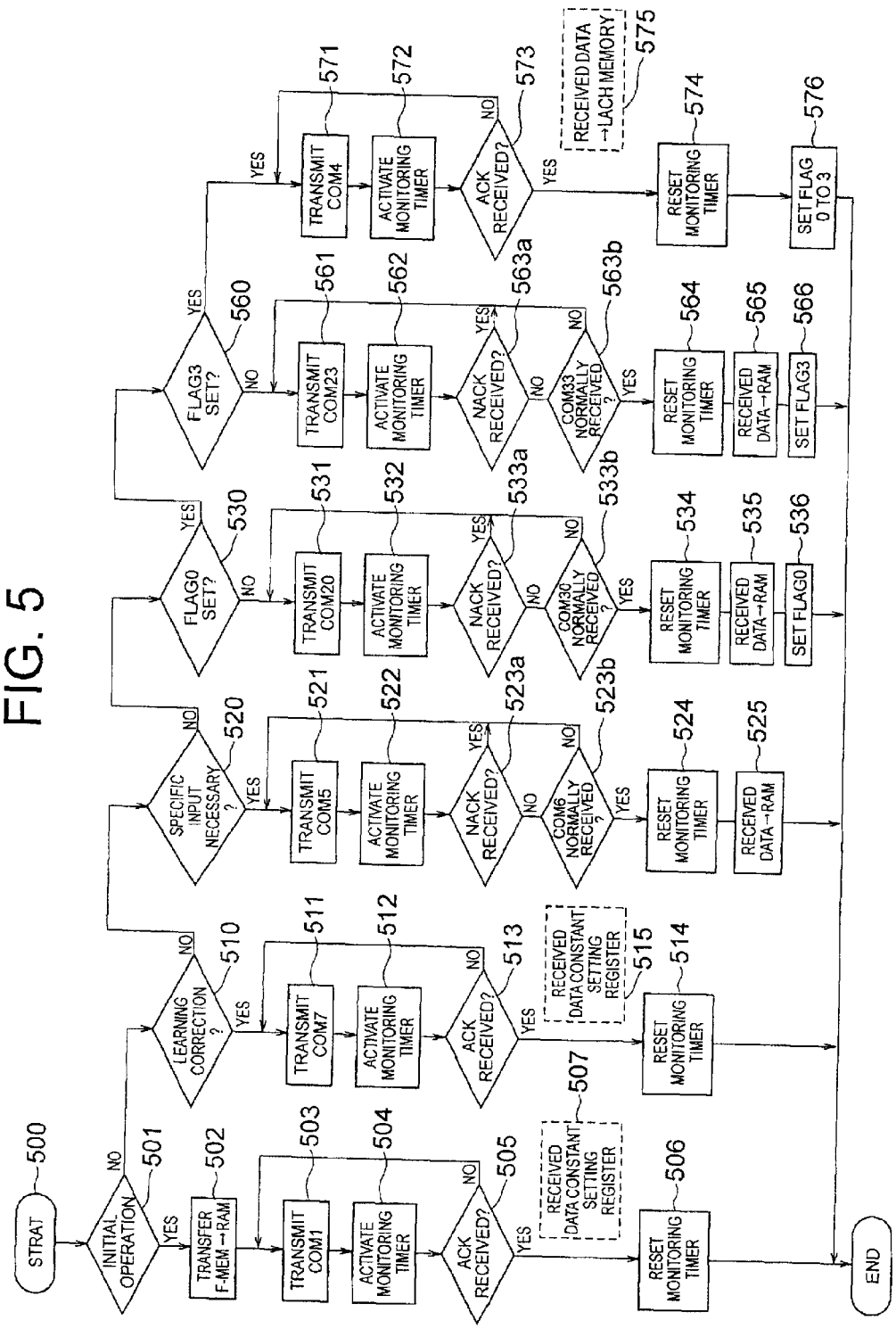
FIG. 5 is a flowchart for explaining the operation of FIG. 1.

FIG. 5 is a flowchart for explaining the operations of the microprocessor 111.

In FIG. 5, reference numeral 500 denotes an operation start step that is activated periodically. Reference numeral 501 denotes a step which follows the operation start step 500 and judges if an operation is initial since the on-vehicle electronic controller 100 is turned on. Reference numeral 502 denotes a step which is carried out when the step 501 is judged as being an initial operation and which transfers a filter constant stored in the nonvolatile memory 112 to a predetermined region of the RAM memory 113. Reference numeral 503 denotes a step of transmitting a filter constant transferred to the RAM memory 113 in the frame structure 400 of FIG. 4a. Reference numeral 504 denotes a step of activating a communication time monitoring timer (not shown). Reference numeral 505 denotes a step of receiving the frame structure 401 of FIG. 4a and judging if the content is normal reception acknowledgement ACK or abnormal reception NACK. Reference numeral 506 denotes a step which is carried out when the step 505 is judged as normal reception ACK and resets the monitoring timer activated in the step 504.

Here, when abnormal reception NACK is found in the step 505, the process returns to the step 503 to transmit a filter constant again. When normal reception acknowledgement ACK cannot be obtained again, time is up on the monitoring timer activated in the step 504, and the microprocessor 111 is reset by an abnormality processing circuit (not shown).

Further, reference numeral 507 denotes a reference description in which a filter constant normally received in the second LSI 120 is stored in the constant setting registers 137a and 137b.

Reference numeral 510 denotes a step which is carried out when the step 501 is not judged as an initial operation and which judges if some of the filter constants stored in the RAM memory 113 are subjected to learning correction by checking the content of a flag (not shown). Reference numeral 511 denotes a step which is carried out when the step 510 judges that learning correction is present and which transmits a filter constant transferred to the RAM memory 113 in the frame structure 408 of FIG. 4e. Reference numeral 512 denotes a step of activating a communication time monitoring timer (not shown). Reference numeral 513 denotes a step of receiving the frame structure 401 of FIG. 4e and judging if the content is normal reception acknowledgement ACK or abnormal reception NACK. Reference numeral 514 denotes a step which is carried out when the step 513 is judged as normal reception ACK and which resets the monitoring timer activated in the step 512.

Here, when abnormal reception NACK is found in the step 513, the process returns to the step 511 to transmit a filter constant again. When normal reception acknowledgement ACK cannot be obtained again, time is up on the monitoring timer activated in the step 512, and the microprocessor 111 is reset by an abnormality processing circuit (not shown).

Further, reference numeral 515 denotes a reference description in which a filter constant normally received in the second LSI 120 is stored in the constant setting register 137a or 137b having an designated address.

Reference numeral 520 denotes a step which is carried out when the step 510 judges that learning correction is absent and which judges the necessity for specific input information. Reference numeral 521 denotes a step which is carried out when specific input is judged as being necessary in the step 520 and which requests transmission of input information of a specific address in the frame structure 406 shown in FIG. 4d. Reference numeral 522 denotes a step of activating a communication time monitoring timer (not shown). Reference numeral 523a denotes a step of judging if abnormal reception NACK is received instead of the frame structure 407 shown in FIG. 4d. Reference numeral 523b denotes a step of receiving the frame structure 407 instead of abnormal reception NACK and judging a sum check result of received data to judge if the reception is normal. Reference numeral 524 denotes a step which is carried out when the reception of the step 523b is judged as being normal and which resets the monitoring timer activated in the step 522. Reference numeral 525 denotes a step of storing the received input information in the RAM memory 123.

Besides, when abnormal reception NACK is found in the step 523a or a sum check error is found in the step 523b, the process returns to the step 521 to request the retransmission of specific input information. When normal reception cannot be made again, time is up on the monitoring timer activated in the step 522, and the microprocessor 111 is reset by an abnormality processing circuit (not shown).

Moreover, in the step 520, in a process in which the microprocessor 111 controls an engine according to a control flowchart (not shown), a flag (not shown) is set when the latest specific input information is necessary. The step 520 judges if the flag is set.

Reference numeral 530 denotes a step which is carried out when the step 520 judges that specific input is unnecessary and which judges if transmission should be requested regarding input information of a first group. Reference numeral 531 denotes a step which is carried out when the step 530 judges that the transmission should be requested regarding input information of the first group and which requests the transmission of input information of the first group in the frame structure 402 shown in FIG. 4b. Reference numeral 532 denotes a step of activating a communication time monitoring timer (not shown). Reference numeral 533a denotes a step of judging if abnormal reception NACK is received instead of the frame structure 403 shown in FIG. 4b. Reference numeral 533b denotes a step of receiving the frame structure 403 instead of abnormal reception NACK and judging a sum check result of received data to judge if the reception is normal. Reference numeral 534 denotes a step which is carried out when the reception of the step 533b is judged as being normal and which resets the monitoring timer activated in the step 532. Reference numeral 535 denotes a step of storing the received input information in the RAM memory 123. Reference numeral 536 denotes a step of setting flag 0 for remembering that the input information of the first group is received normally.

Besides, when abnormal reception NACK is found in the step 533a or a sum check error is found in the step 533b, the process returns to the step 531 to request retransmission of specific input information of the first group. When normal reception cannot be made again, time is up on the monitoring timer activated in the step 532, and the microprocessor 111 is reset by an abnormality processing circuit (not shown).

Further, when the step 530 is carried out for the first time, flag 0 of the step 536 has not been set. Thus, the judgement of the step 530 is NO. When the step 530 is carried out next time, the judgement is YES and the process directly moves from the step 530 to a step 540 (not shown), which carries out a flow of requesting transmission regarding input information of a second group.

Likewise, transmission request and reception is made on input information of a third group.

Reference numeral 560 denotes a step which is carried out when a step 550 (not shown) judges that the third group input is unnecessary (flag 2 has been set) and which judges if transmission should be requested for input information of a fourth group. Reference numeral 561 denotes a step which is carried out when the step 560 judges that transmission should be requested for input information of the fourth group and which requests the transmission of the input information of the fourth group in the frame structure 402 shown in FIG. 4b. Reference numeral 562 denotes a step of activating a communication time monitoring timer (not shown). Reference numeral 563a denotes a step of judging if abnormal reception NACK is received instead of the frame structure 403 shown in FIG. 4b. Reference numeral 563b denotes a step of receiving the frame structure 403 instead of abnormal reception NACK and judging a sum check result of received data to judge if the reception is normal. Reference numeral 564 denotes a step which is carried out when the reception of the step 563b is judged as being normal and which resets the monitoring timer activated in the step 562. Reference numeral 565 denotes a step of storing the received input information in the RAM memory 123. Reference numeral 566 denotes a step of setting flag 3 for remembering that the input information of the fourth group is received normally.

Besides, when abnormal reception NACK is found in the step 563a or a sum check error is found in the step 563b, the process returns to the step 561 to request retransmission of input information of the fourth group. When normal reception cannot be made again, time is up on the monitoring timer activated in the step 562, and the microprocessor 111 is reset by an abnormality processing circuit (not shown).

Further, when the step 560 is carried out for the first time, flag 3 of the step 566 has not been set. Thus, the judgement of the step 560 is NO. When the step 560 is carried out next time, the judgement is YES and the process directly moves from the step 560 to a step 571.

Reference numeral 571 denotes a step of guiding the transmission of output information in the frame structure 404 shown in FIG. 4c. Reference numeral 572 denotes a step of activating a communication time monitoring timer (not shown). Reference numeral 573 denotes a step of judging if normal reception acknowledgement ACK is received in the frame structure 401. Reference numeral 574 denotes a step which is carried out when the step 573 judges that the reception is normal and which resets the monitoring timer activated in the step 572. Reference numeral 576 denotes a step of resetting flags 0 to 3 that are set in the steps 536, 546 (not shown), 556 (not shown), and 566.

Besides, when abnormal reception NACK is found in the step 573, the process returns to the step 571 to retransmit output information. When normal reception cannot be made again, time is up on the monitoring timer activated in the step 572, and the microprocessor 111 is reset by an abnormality processing circuit (not shown).

Further, reference numeral 575 denotes a reference description in which output information normally received in the second LSI 120 is stored in the output latch memory 125.

Reference numeral 508 denotes an operation end step which follows the steps 506, 514, 525, 536, 546 (not shown), 556 (not shown), 566, and 576. In the step 508, the operation is on standby until the operation start step 500 is reactivated.

The outline of the above operational flow will be described. The steps 502 to 506 serving as a first flow constitute a resetting flow when the power is turned on. The filter constants stored in the nonvolatile memory 112 are transferred and stored together in the constant setting registers 137a and 137b.

The steps 511 to 514 serving as a second flow are carried out only when a filter constant is changed. The second flow changes the content of the constant setting register on the corresponding address.

The steps 521 to 525 serving as a third flow are carried out only when input information of a specific address is necessary. The input information of the address is stored in the RAM memory 113.

In the steps 531 to 536 serving as a fourth flow to the steps 561 to 566 serving as a seventh flow, transmission is requested for input information DIG1, DIG2, DIG3, AI1 to AI5 of the first group, input information AI6 to AI13 of the second group, input information AI14 to AI21 of the third group, and input information AI22 to AI29 of the fourth group. And then, the input information is stored in the RAM memory 123.

In the steps 571 to 576 serving as an eighth flow, the output information OUTs1 to OUTsk is transmitted from the RAM memory 113 to the output latch memory 125.

During the operation of the microprocessor 111, when a change in a filter constant is not transmitted or transmission of specific input information is not requested, the fourth to eighth flows are repeatedly carried out every time the operation start step 500 is activated periodically. When a change in a filter constant is transmitted or transmission of specific input information is requested, the second to third flows are carried out with higher priority.

As described above, the present embodiment is constituted by the microprocessor including the nonvolatile memory, in which a control program for a controlled vehicle, a control constant, and so on are written from the external tool, and the RAM memory for computing; the integrated circuit including the direct input interface circuits and the direct output interface circuits that are connected to the data bus of the microprocessor, the variable filter circuit having the indirect input interface circuits and the constant setting registers, and the communication control circuit; and the interactive serial communication circuits for transmitting a plurality of external input signals to the RAM memory, the signals being inputted via the indirect input interface circuits, and for transmitting filter constants stored in the nonvolatile memory to the constant setting registers of the variable filter circuit.

Therefore, it is possible to entirely miniaturize the product by reducing the filter capacitor in size and to standardize the product by setting an adequate input filter constant according to a vehicle to be controlled. Further, it is possible to reduce the burden of the microprocessor and prevent degradation in capability by forming the variable filter circuit with external hardware.

[Embodiments 2]

Figure 6:
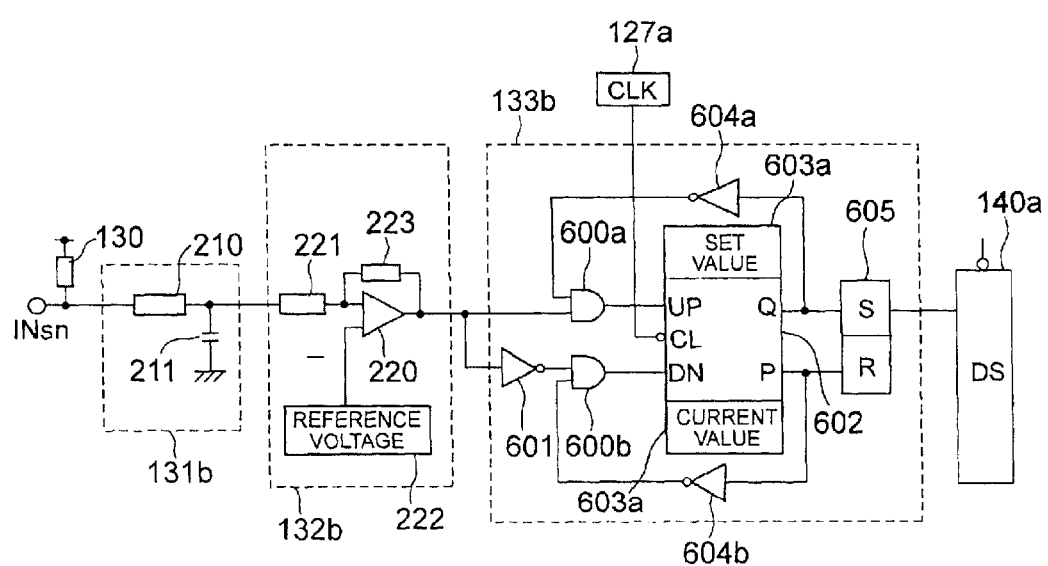
FIG. 6 is a block circuit diagram showing an ON/OFF signal variable filter according to Embodiment 2 of the present invention.

FIG. 6 shows a variable filter circuit for an ON/OFF signal according to Embodiment 2 of the present invention.

In FIG. 6, an input signal INsn having a low-resistance bleeder resistor 130 is connected to a parallel small capacitor 211 of a dozen pF or so via a series resistor 210 having a high resistance of several hundreds KΩ, which is an upper limit value in practical use.

Reference numeral 131b denotes a noise filter composed of the series resistance 210 and the small capacitor 211. The noise filter absorbs and smoothes high-frequency noise.

Reference numeral 132b denotes a level-judging comparator composed of an input resistor 221, a reaction resistor 223, and a comparator 220. A predetermined reference voltage 222 (voltage Von) is applied to the inverted input of the comparator 220.

Therefore, when a charging voltage of the small capacitor 211 is at a reference voltage Von or more, the output of the comparator 220 is set at "H" (logic "1"). The hysteresis function is provided such that when the output of the comparator 220 is set at "H", since the reaction resistor 223 adds an input, the output of the comparator 220 is not set at "L" (logic "0") unless a charging voltage of the small capacitor 211 decreases to Voff (<Von).

The above function is provided for preventing noise ripple, which is superposed in the small capacitor 211, from frequently inverting the output of the comparator 220.

Reference numeral 600a denotes a gate element connecting the output of the comparator 220 and a count-up mode input UP of a reversible counter 602. Reference numeral 601 denotes a logic inversion element connected to a countdown mode input DN of the reversible counter 602 from the output of the comparator 220 via a gate element 600b. The reversible counter 602 includes a clock input terminal CL connected to a clock generator 127c, which is turned on and off with a predetermined period, and the reversible counter 602 reversibly counts clock input according to mode inputs UP and DN.

Reference numeral 603a denotes a constant setting register for storing a set value corresponding to number N of logic judgement points. Reference numeral 603b denotes a current value register for storing a current value of the reversible counter 602. Reference numeral 604a denotes a logic inversion element, which closes a gate element 600a by output Q of logic "1" to prevent another count up when a current value of the reversible counter 602 reaches a set value N. Reference numeral 604b denotes a logic inversion element, which closes a gate element 600b by output P of logic "1" to prevent another countdown when a current value of the reversible counter 602 is 0. Reference numeral 605 denotes an input deciding register composed of a flip-flop element, which is set by a set value reach output Q of the reversible counter 602 and is reset by output P at a current value 0. The output of the input deciding register 605 is connected to the input terminal of an input data selector 140a.

In the reversible counter 602 configured thus, until an input pulse frequency of a clock input CL, which operates with a period T, reaches a set value N of the constant setting register 603a, when the output of the comparator 220 is continuously "H", the input deciding register 605 is set. When the output of the comparator 220 is set at "L" at some midpoint, the clock input undergoes subtraction counting, and when the output of the comparator 220 is set at "H" again, the clock input undergoes addition counting. When a current value reaches the set value N, the input deciding register 605 is set.

Likewise, a controller according to claim 1 of the present invention, in which once the input deciding register 605 is set, the output of the comparator 220 is continuously "L" until a current value decreases from the set value N to 0 by the input pulse of the clock input CL, which is operated with the period T, the controller being constituted by the microprocessor including the nonvolatile memory, in which a control program for a controlled vehicle, a control constant, and soon are written from the external tool, and the RAM memory for computing; the integrated circuit including the direct input interface circuits and the direct output interface circuits that are connected to the data bus of the microprocessor, the variable filter circuit having the indirect input interface circuits and the constant setting registers, and the communication control circuit; and the interactive serial communication circuits for transmitting a plurality of external input signals to the RAM memory, the signals being inputted via the indirect input interface circuits, and for transmitting filter constants stored in the nonvolatile memory to the constant setting registers of the variable filter circuit.

The above configuration provides a measure to entirely miniaturize the product by reducing the filter capacitor in size and to standardize the product by setting an adequate input filter constant according to a vehicle to be controlled. Further, the measure can reduce the burden of the microprocessor and prevent degradation in capability by forming the variable filter circuit with external hardware.

When the output of the comparator 220 is "L", the input deciding register 605 is reset. When the output of the comparator 220 is set at "H" at some midpoint, the clock input undergoes addition counting. After the output of the comparator 220 is set at "L" again, subtraction counting is carried out. When a current value reaches 0, the input deciding register 605 is reset.

Furthermore, instead of variably setting the number of logic judgement points according to a set value of the reversible counter 602 in the above manner, a pulse frequency of the clock generator 127c may be variably set.

[Embodiments 3]

Figure 7:
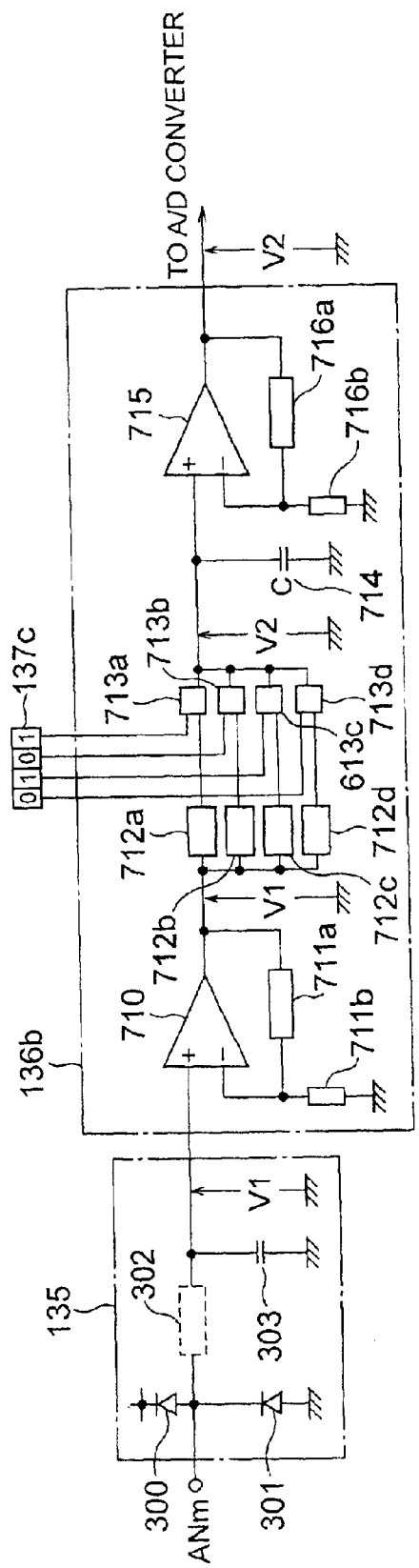
FIG. 7 is a block circuit diagram showing an analog signal variable filter according to Embodiment 3 of the present invention.
Figure 8:
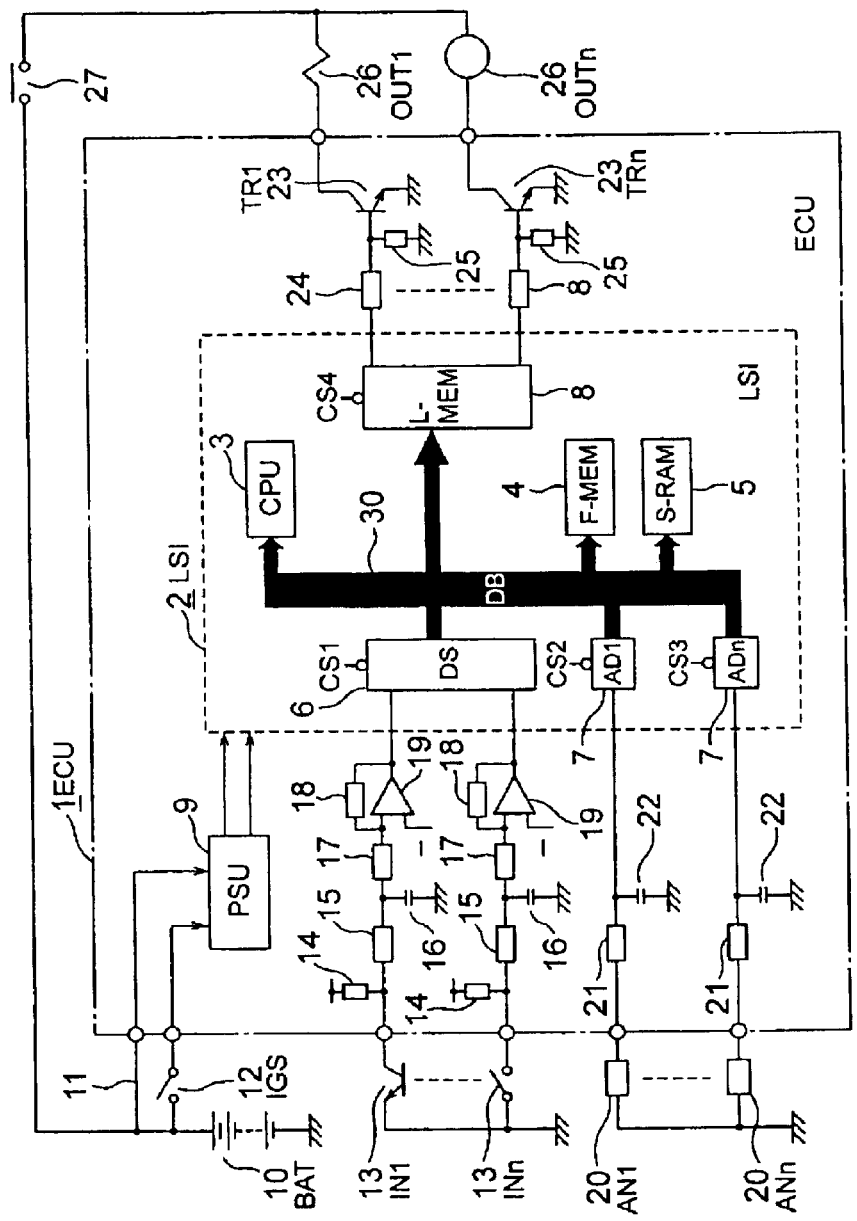
FIG. 8 is a block circuit diagram entirely showing a conventional electronic controller.

FIG. 7 shows a variable filter circuit for an analog signal according to Embodiment 3 of the present invention.

In FIG. 7, reference numeral 135 denotes a noise filter for an analog input signal ANm. The noise filter 135 is composed of a positive clip diode 300, a negative clip diode 301, a series resistor 302, and a parallel small capacitor 303.

When excessive noise is superposed on the analog input signal ANm, the clip diodes 300 and 301 reflux noise voltage in a positive/negative circuit of power supply and prevent a voltage more than a maximum value or less than a minimum value of an assumed analog signal from being applied to the small capacitor 303.

Moreover, when an analog sensor (not shown) connected to the ANm terminal has an equivalent internal resistance, the series resistor 302 can be omitted.

A capacitor 714 (capacity C) constituting the variable filter circuit 136b is charged from filter resistors 712a to 712d via analog gate switches 713a to 713d, which are conduction-controlled by a constant setting register 137c. A charging voltage of the capacitor 714 is a voltage V1 across the small capacity 303 that is amplified by an amplifier 710.

Further, a voltage V2 across the capacitor 714 is outputted via an amplifier 715. After being converted to a digital value by an AD converter 138 of FIG. 1, the voltage V2 is stored in the latch memory 139.

Additionally, reference numerals 711a, 711b, 716a, and 716b are feedback circuit resistors for connecting the outputs of the amplifiers 710 and 715 to the inverted inputs of the corresponding amplifiers.

Hence, the variable filter circuit 136b configured thus is equivalent to an RC filter composed of a capacitor CB and a parallel synthetic resistor RB, in which the analog gate switches 713a to 713d are turned on in the filter resistors 712a to 712d. The parallel synthetic resistor RB can be variably changed according to the content of the constant setting register 137c.

[Embodiment 4]

The embodiment of FIG. 1 does not include an analog output. A DA converter for meter indication may be installed as an indirect output when necessary.

Actually, since low-speed output points of such an analog output and ON/OFF operations are not large in number, without depending upon serial communication, the output may come directly from a latch memory 115 on the side of a microprocessor 111.

Further, for fail-safe driving, even in the case of a low-speed input signal, it is important to input minimum input information required for maintaining the rotation of an engine directly to the microprocessor 111 without depending upon serial communication.

In the embodiment of FIG. 1, the clock generator 127 is disposed in the second LSI 120. A clock signal line may be added to a serial communication line and synchronization control may be carried out by using a clock signal of the microprocessor 111. Further, the clock generators of FIGS. 2, 3, and 6 are each composed of a frequency divider of a basic clock signal.

Moreover, a DMAC (Direct Memory Access Controller) is connected to a data bus 118 of the microprocessor 111. During an internal computing period in which the microprocessor 111 does not use the data bus 118, by transferring data directly to the RAM memory 113 in response to a serial-parallel conversion completion signal from the serial-parallel converter 116, it is possible to shorten time for serial communication and reduce the burden of the microprocessor 111.

What is claimed is:

1. An on-vehicle electronic controller comprising:
a microprocessor including a nonvolatile memory, in which at least one of a control program for a controlled vehicle and a control constant are written from an external tool, and a RAM memory for computing;
an integrated circuit including a direct input interface circuit and a direct output interface circuit that are connected to a data bus of the microprocessor, one or more indirect input interface circuits, one or more variable filter circuits having constant setting register, and a communication control circuit; and
an interactive serial communication circuit for transmitting a plurality of external input signals to the RAM memory, the signals being inputted via the one or more indirect input interface circuits, and for transmitting a filter constant stored in the nonvolatile memory to the constant setting register of the variable filter circuit.

2. The on-vehicle electronic controller according to claim 1, wherein at least one of the indirect input interface circuits is an interface circuit for ON/OFF signals, each circuit being constituted by a low-resistance bleeder resistor acting as a load on an input switch, a noise filter composed of a high-resistance series resistor and a small capacitor, and a level-judging comparator having a hysteresis function; the variable filter circuit is constituted by an input deciding register, which is set when a plurality of consecutive level judging results being sampled and stored with a predetermined period are all YES, and which is reset when a plurality of consecutive level judging results are all NO, and a constant setting register for storing a value of at least one of the sampling period and the number of logic judging points for setting/resetting; the output of the input deciding register is transmitted to the RAM memory; and the value of at least one of the sampling period and the number of the logic judging points for setting/resetting is transmitted from the nonvolatile memory to the constant setting register.

3. The on-vehicle electronic controller according to claim 1, wherein at least one of the indirect input interface circuits is an interface circuit for an analog signal, each circuit being composed of a noise filter including positive and negative clip diodes and a small capacitor, the variable filter circuit is constituted by a switched capacitor, which is periodically charged and discharged by a switch, and a constant setting register for storing a value of a charging/discharging period, the output of the switched capacitor is converted to a digital value via an A/D converter, the digital converted value is transmitted to the RAM memory, and a value of a charging/discharging period is transmitted from the nonvolatile memory to the constant setting register.

4. The on-vehicle electronic controller according to claim 1, wherein part of control output of the microprocessor is supplied to a latch memory which stores a transmitted control output signal via the interactive serial communication circuit, and then to an external load via an indirect output interface circuit connected to the output of the latch memory.

5. The on-vehicle electronic controller according to claim 1, wherein direct input and direct output supplied to the data bus of the microprocessor require fast response in a control operation, and indirect input and indirect output communicated with the microprocessor via the interactive serial communication circuit are input signals of low-speed and low-frequency operations or output signals of low-speed and low-frequency operations.

6. The on-vehicle electronic controller according to claim 5, wherein the input signals of low-speed and low-frequency operations correspond to at least one of a manual operation signal, a temperature sensor, and a water temperature sensor.

7. The on-vehicle electronic controller according to claim 5, wherein the output signals of low-speed and low-frequency operations correspond to at least one of an auxiliary output and a warning display output.

8. The on-vehicle electronic controller according to claim 5, wherein the control operation is for ignition control of an engine.

9. The on-vehicle electronic controller according to claim 5, wherein the control operation is for control of fuel injection.

10. The on-vehicle electronic controller according to claim 1, wherein the microprocessor transmits a filter constant and a command of input information transmission request that follow a command of filter constant transmission guide to the integrated circuit via the interactive serial communication circuit, and the integrated circuit stores a received filter constant in the constant setting register and transmits indirect input signal information following a command of input information reply guide to the RAM memory via the interactive serial communication circuit and the microprocessor.

11. The on-vehicle electronic controller according to claim 1, wherein the microprocessor transmits a filter constant following the command of filter constant transmission guide and indirect output information or input information transmission request that follows the command of output information transmission guide to the integrated circuit via the interactive serial communication circuit, and the integrated circuit store a received filter constant and indirect output information in the constant setting register and the latch memory and transmits indirect input signal information following the command of input information reply guide to the RAM memory via the interactive serial communication circuit and the microprocessor.

12. The on-vehicle electronic controller according to claim 1, wherein the microprocessor transmits address information following a command of specific input information transmission request to the integrated circuit via the interactive serial communication circuit, and the integrated circuit transmits indirect input information of a designated address following a command of specific input information reply guide to the RAM memory via the interactive communication circuit and the microprocessor.

13. The on-vehicle electronic controller according to claim 1, wherein the microprocessor transmits address information and a filter constant that follow a command of specific constant transmission guide to the integrated circuit via the interactive serial communication circuit, and the integrated circuit stores the received filter constant in the constant setting register at a designated address.

* * * * *